(12) United States Patent
Sakurai et al.

(10) Patent No.: US 11,298,976 B2
(45) Date of Patent: Apr. 12, 2022

(54) BEARING DEVICE FOR VEHICLE WHEEL

(71) Applicant: NTN Corporation, Osaka (JP)

(72) Inventors: Ryou Sakurai, Shizuoka (JP); Adumi Nobukawa, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 17/264,614

(22) PCT Filed: Aug. 6, 2019

(86) PCT No.: PCT/JP2019/030821
§ 371 (c)(1),
(2) Date: Jan. 29, 2021

(87) PCT Pub. No.: WO2020/036093
PCT Pub. Date: Feb. 20, 2020

(65) Prior Publication Data
US 2021/0293278 A1    Sep. 23, 2021

(30) Foreign Application Priority Data

Aug. 16, 2018  (JP) ............................. JP2018-153304

(51) Int. Cl.
*B60B 27/00* (2006.01)
*F16C 41/00* (2006.01)
*F16C 35/00* (2006.01)
*F16C 35/077* (2006.01)
*F16C 33/78* (2006.01)

(52) U.S. Cl.
CPC .......... *B60B 27/0073* (2013.01); *F16C 35/00* (2013.01); *F16C 35/077* (2013.01); *F16C 41/007* (2013.01); *F16C 33/7883* (2013.01); *F16C 2326/02* (2013.01)

(58) Field of Classification Search
CPC ............... B60B 27/0073; F16C 33/723; F16C 33/7883; F16C 35/00; F16C 35/077; F16C 41/007; F16C 2326/02
See application file for complete search history.

(56) References Cited

FOREIGN PATENT DOCUMENTS

| JP | 2010-101332 | 5/2010 |
| JP | 2015-137754 | 7/2015 |
| JP | 2016-078512 | 5/2016 |
| JP | 2017-053389 | 3/2017 |
| JP | 2017-145895 | 8/2017 |
| KR | 10-2012-0046534 | 5/2012 |

OTHER PUBLICATIONS

International Search Report dated Sep. 3, 2019 in International (PCT) Application No. PCT/JP2019/030821.

*Primary Examiner* — Alan B Waits
(74) *Attorney, Agent, or Firm* — Wenderoth, Lind & Ponack, L.L.P.

(57) ABSTRACT

In a bearing device for a vehicle wheel (1), a large-diameter section (2*i*) is formed on an outer side of a fitting cylinder section (2*h*), and a small-diameter section (2*j*) is formed on an inner side of the fitting cylinder section (2*h*). A cap member (8) is formed by bending a metal steel plate, and has a cover plate section (81) which closes the inner open end of an outer member (2) and a fitting section (82) which is fitted over the small-diameter section (2*j*). A tapered portion (83) based on the spring back angle θ of the fitting section (82) is provided at the outer peripheral edge of the outer end section of the fitting section (82).

4 Claims, 8 Drawing Sheets

BEARING DEVICE FOR VEHICLE WHEEL

TECHNICAL FIELD

The present invention relates to a bearing device for a vehicle wheel.

BACKGROUND ART

Conventionally, a bearing device for a vehicle wheel that rotatably supports a wheel has been known. In the bearing device for a vehicle wheel, an inner member is arranged inside an outer member, and a rolling member is interposed between respective raceway surfaces of the outer member and the inner member. In this way, the bearing device for a vehicle wheel forms a rolling bearing structure, and allows a wheel mounted to the inner member to be rotatable.

Meanwhile, in the bearing device for a vehicle wheel, an annular space is formed between the outer member and the inner member. When muddy water enters into this annular space, the raceway surface and the rolling member are damaged by dust and the like contained in the muddy water, which results in shortening of a bearing life. Therefore, such a bearing device for a vehicle wheel includes a seal member and a cap member in order to prevent muddy water from entering the annular space (see Patent Literature 1 and Patent Literature 2).

A cap member disclosed in Patent Literature 1 and Patent Literature 2 is formed by cutting out and bending a metal steel plate by press working. The cap member has a cover plate section that closes an inner open end of the outer member, and a fitting section that is fitted over a fitting cylinder section of the outer member. Note that some cap members have also a role of supporting a sensor in addition to preventing entering of muddy water In addition, such a bearing device for a vehicle wheel is fixed in a state where the fitting cylinder section of the outer member is fitted into a fitting hole section of a vehicle body-side member. Therefore, if the fitting cylinder section of the outer member can be smoothly fitted into the fitting hole section of the vehicle body-side member, an assembling property of an automobile can be improved. However, when the fitting section of the cap member is opened radially outward due to spring back or the like, this fitting section may interfere with an inner peripheral edge of the fitting hole section and may not be fitted smoothly (see FIG. 8). Therefore, there has been a demand for a bearing device for a vehicle wheel in which the fitting section of the cap member does not interfere with the inner peripheral edge of the fitting hole section when the fitting cylinder section of the outer member is fitted into the fitting hole section of the vehicle body-side member, and accordingly the assembling property of an automobile can be improved.

CITATIONS LIST

Patent Literatures

Patent Literature 1: JP-A 2017-145895 Gazette
Patent Literature 2: JP-A 2016-78512 Gazette

SUMMARY OF INVENTION

Technical Problems

There is provided a bearing device for a vehicle wheel in which a fitting section of a cap member does not interfere with an inner peripheral edge of a fitting hole section when a fitting cylinder section of an outer member is fitted into the fitting hole section of a vehicle body-side member, and accordingly an assembling property of an automobile can be improved.

Solutions to Problems

A first invention is that, in a bearing device for a vehicle wheel including:
an outer member formed with an outer raceway surface;
an inner member that includes a hub ring and at least one inner ring that is fitted over the hub ring, and is formed with an inner raceway surface;
a rolling member interposed between respective raceway surfaces of the outer member and the inner member; and
a cap member that is fitted over the outer member,
the bearing device for a vehicle wheel is fixed in a state where a fitting cylinder section formed at an inner end section of the outer member is fitted into a fitting hole section of a vehicle body-side member.

In the bearing device for a vehicle wheel,
a large-diameter section is formed on an outer side of the fitting cylinder section,
a small-diameter section is formed on an inner side of the fitting cylinder section, and
the cap member is formed by bending a metal steel plate, to have a cover plate section that closes an inner open end of the outer member and have a fitting section that is fitted over the small-diameter section, and to be provided with a tapered portion based on a spring back angle of the fitting section, on an outer peripheral edge at an outer end section of the fitting section.

A second invention is that, in the bearing device for a vehicle wheel according to the first invention,
when an angle of an outer peripheral surface of the fitting section with respect to a rotation axis of the inner member is R1, and
an angle of an inclined surface of the tapered portion with respect to the outer peripheral surface of the fitting section is R2,
a relational expression R1≤R2 is satisfied.

A third invention is that, in the bearing device for a vehicle wheel according to the first or second invention,
when an inner diameter of the fitting section is D1,
an outer diameter of the small-diameter section is D2,
an outer diameter of the fitting section is D3, and
an outer diameter of the large-diameter section is D4,
a relational expression D1≤D2 and a relational expression D3≤D4 are satisfied.

A fourth invention is that, in the bearing device for a vehicle wheel according to any one of the first to third inventions, there are provided:
an encoder that rotates integrally with the inner member, and
a sensor that is in proximity to the encoder and detects magnetism of the encoder, and
the cap member supports the sensor.

Advantageous Effects of Invention

Effects of the present invention are as follows.

In the bearing device for a vehicle wheel according to the first invention, the large-diameter section is formed on the outer side of the fitting cylinder section, and the small-diameter section is formed on the inner side of the fitting cylinder section. Then, the cap member is formed by bending a metal steel plate, to have the cover plate section that closes the inner open end of the outer member and have the fitting section that is fitted over the small-diameter section, and to be provided with the tapered portion based on the spring back angle of the fitting section, on the outer peripheral edge at the outer end section of the fitting section. According to such a bearing device for a vehicle wheel, the fitting section of the cap member does not interfere with the inner peripheral edge of the fitting hole section when the fitting cylinder section of the outer member is fitted into the fitting hole section of the vehicle body-side member, and accordingly an assembling property of an automobile can be improved.

In the bearing device for a vehicle wheel according to the second invention, when an angle of the outer peripheral surface of the fitting section with respect to the rotation axis of the inner member is R1, and an angle of the inclined surface of the tapered portion with respect to the outer peripheral surface of the fitting section is R2, a relational expression R1≤R2 is satisfied. According to such a bearing device for a vehicle wheel, it is possible to reliably prevent the fitting section of the cap member from interfering with the inner peripheral edge of the fitting hole section. Therefore, it is possible to further improve the assembling property of the automobile.

In the bearing device for a vehicle wheel according to the third invention, when an inner diameter of the fitting section is D1, an outer diameter of the small-diameter section is D2, an outer diameter of the fitting section is D3, and an outer diameter of the large-diameter section is D4, a relational expression D1≤D2 and a relational expression D3≤D4 are satisfied. According to such a bearing device for a vehicle wheel, even with a design in which the fitting section is pushed strongly to the small-diameter section to prevent falling off, it is possible to reliably prevent the fitting section of the cap member from interfering with the inner peripheral edge of the fitting hole section. Therefore, it is possible to prevent the cap member from falling off, and further improve the assembling property of the automobile.

The bearing device for a vehicle wheel according to the fourth invention includes the encoder that rotates integrally with the inner member, and the sensor that is in proximity to the encoder and detects magnetism of the encoder. Then, the cap member supports the sensor. According to such a bearing device for a vehicle wheel, the cover plate section of the cap member is not distorted, so that a gap between the encoder and the sensor does not vary.

DESCRIPTION OF EMBODIMENTS

Figure 1:
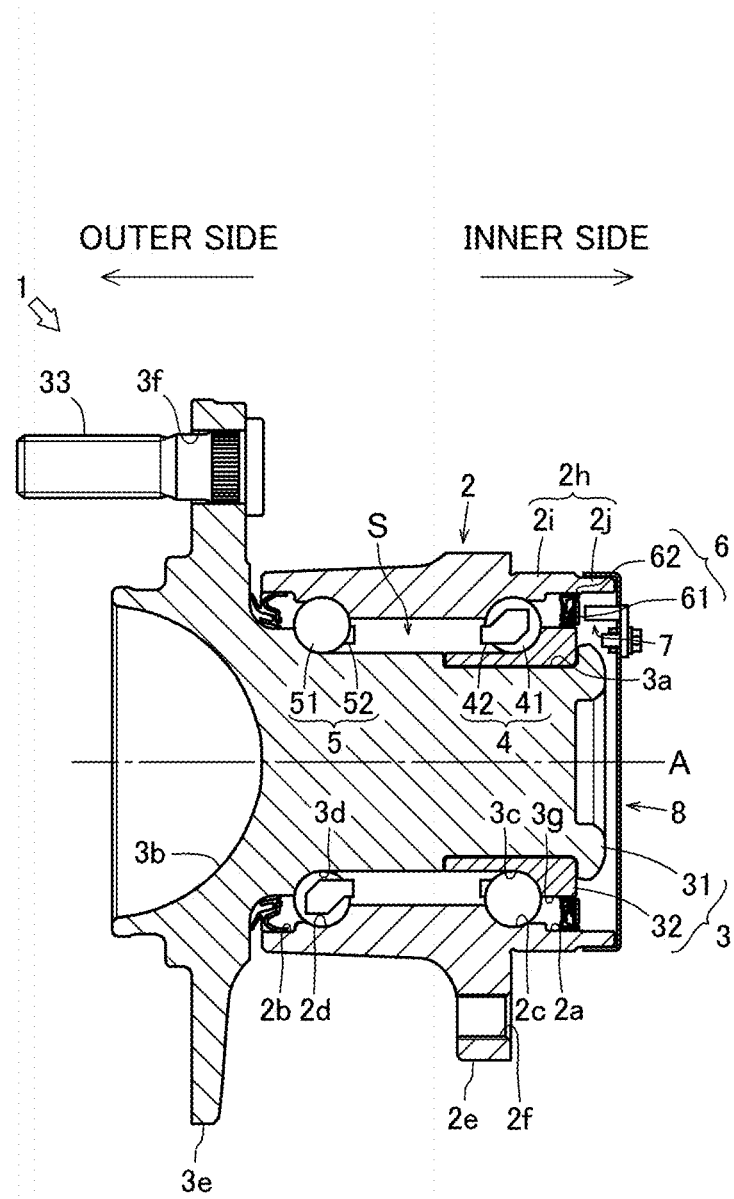
FIG. 1 is a view showing a structure of a bearing device for a vehicle wheel.
Figure 2:
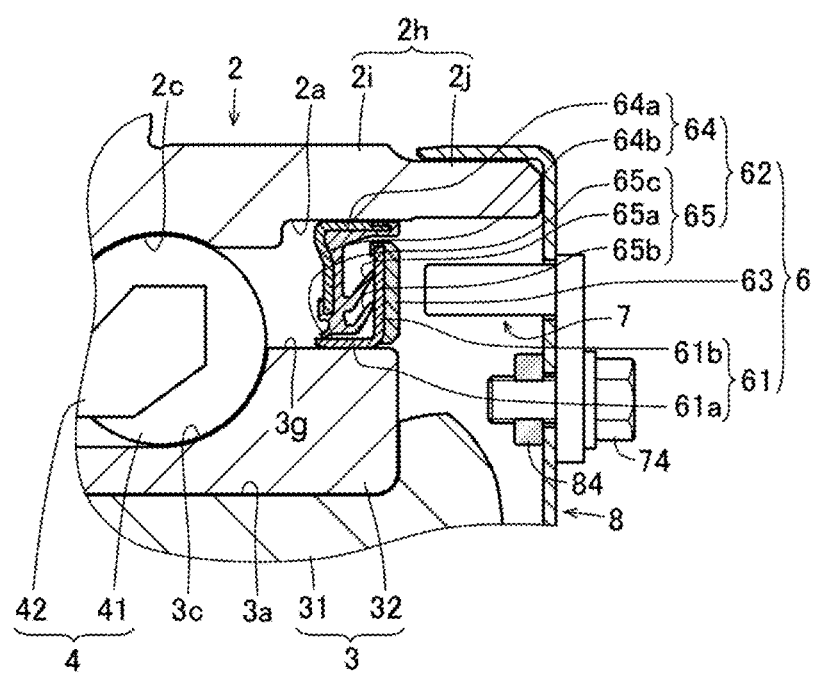
FIG. 2 is a view showing a partial structure of the bearing device for a vehicle wheel.

A bearing device for a vehicle wheel 1 according to the present invention will be described. FIG. 1 is a view showing a structure of the bearing device for a vehicle wheel 1. FIG. 2 is a view showing a partial structure of the bearing device for a vehicle wheel 1.

The bearing device for a vehicle wheel 1 rotatably supports a wheel. The bearing device for a vehicle wheel 1 includes an outer member 2, an inner member 3, and rolling members 4 and 5. Note that, in this specification, "inner side" represents a vehicle body side of the bearing device for a vehicle wheel 1 when mounted to the vehicle body, and "outer side" represents a wheel side of the bearing device for a vehicle wheel 1 when mounted to the vehicle body. Further, "radially outward" represents a direction away from a rotation axis A of the inner member 3, and "radially inward" represents a direction approaching the rotation axis A of the inner member 3. Further, "axial direction" represents a direction along the rotation axis A of the inner member 3.

The outer member 2 forms an outer ring portion of a rolling bearing structure. On an inner periphery at an inner end section of the outer member 2, a fitting surface 2a is formed. Further, on an inner periphery at an outer end section of the outer member 2, a fitting surface 2b is formed. Moreover, on an inner periphery at an axial central section of the outer member 2, two outer raceway surfaces 2c and 2d are formed. In addition, the outer member 2 is formed with a vehicle-body mounting flange 2e that extends radially outward. The vehicle-body mounting flange 2e is provided with a plurality of bolt holes 2f.

The inner member 3 forms an inner ring portion of the rolling bearing structure. The inner member 3 includes a hub ring 31 and an inner ring 32.

The hub ring 31 is arranged inside the outer member 2. On an outer periphery at an inner end section of the hub ring 31, an inner-ring fitting section 3a is formed up to an axial central section. The inner-ring fitting section 3a refers to a portion where an outer diameter of the hub ring 31 is reduced, and an outer peripheral surface thereof has a cylindrical shape centered on the rotation axis A. Further, in a center at an outer end surface of the hub ring 31, an opening hole 3b concaved in a spherical shape is formed. Further, on an outer periphery at an axial central section of the hub ring 31, an inner raceway surface 3d is formed. In addition, the hub ring 31 is formed with a wheel mounting flange 3e that extends radially outward. The wheel mounting flange 3e is provided with a plurality of bolt holes 3f centered on the rotation axis A, and hub bolts 33 are press-fitted into the respective bolt holes 3f.

The inner ring 32 is fitted over the inner-ring fitting section 3a of the hub ring 31. On an outer periphery at an inner end section of the inner ring 32, a fitting surface 3g is formed. Further, on an outer periphery adjacent to the fitting surface 3g, an inner raceway surface 3c is formed. Note that the inner ring 32 is fixed by a swaged section formed by pressing and expanding a tip of the inner-ring fitting section 3a, while being fitted over the inner-ring fitting section 3a.

The rolling members 4 and 5 form a rolling portion of the rolling bearing structure. The rolling member 4 on the inner side includes a plurality of rolling elements 41 and one holder 42. Similarly, the rolling member 5 on the outer side also includes a plurality of rolling elements 51 and one holder 52.

The rolling elements 41 and 51 are arranged in a circle and at equal intervals by the holders 42 and 52, respectively. The rolling element 41 included in the rolling member 4 on the inner side is interposed between the outer raceway surface 2c of the outer member 2 and the inner raceway surface 3c of the inner ring 32. Further, the rolling element 51 included in the rolling member 5 on the outer side is interposed between the outer raceway surface 2d of the outer member 2 and the inner raceway surface 3d of the hub ring 31.

The holders 42 and 52 are annular bodies in which pockets for accommodating the rolling elements 41 and 51 are formed at equal intervals. In the holder 42 included in the rolling member 4 on the inner side, a spherical wall extends between the rolling element 41 and the rolling element 41 adjacent to each other, and one rolling element 41 is sandwiched and held by two spherical walls. Further, in the holder 52 included in the rolling member 5 on the outer side, a spherical wall extends between the rolling element 51 and the rolling element 51 adjacent to each other, and one rolling element 51 is sandwiched and held by two spherical walls.

In addition, this bearing device for a vehicle wheel 1 includes a pair of seal members 6 in order to seal both-side opening ends of an annular space S formed between the outer member 2 and the inner member 3 (the hub ring 31 and the inner ring 32). Here, a description is given while focusing on the seal member 6 attached on an inner open end of the annular space S.

The seal member 6 includes a slinger 61 and a seal ring 62. The slinger 61 has a cylindrical fitting section 61a that is fitted over the fitting surface 3g of the inner member 3 (the inner ring 32), and a disc-shaped side plate portion 61b that extends radially outward from an inner end section of the fitting section 61a. Note that, to the side plate portion 61b of the slinger 61, an encoder 63 is fixed. The encoder 63 is an elastic member in which magnetic poles (N pole and S pole) are alternately arranged in a peripheral direction.

Whereas, the seal ring 62 is obtained by fixing an elastic member 65 to a core metal 64. The core metal 64 has a cylindrical fitting section 64a that is fitted inside the fitting surface 2a of the outer member 2, and a disc-shaped side plate portion 64b that extends radially inward from an outer end section of the fitting section 64a. The elastic member 65 is formed with side lips 65a and 65b, and individual tip edges are in contact with the opposed side plate portion 61b of the slinger 61. Further, the elastic member 65 is formed with a grease lip 65c, and a tip edge thereof is in contact with or in proximity to the opposed fitting section 61a of the slinger 61.

Figure 3:
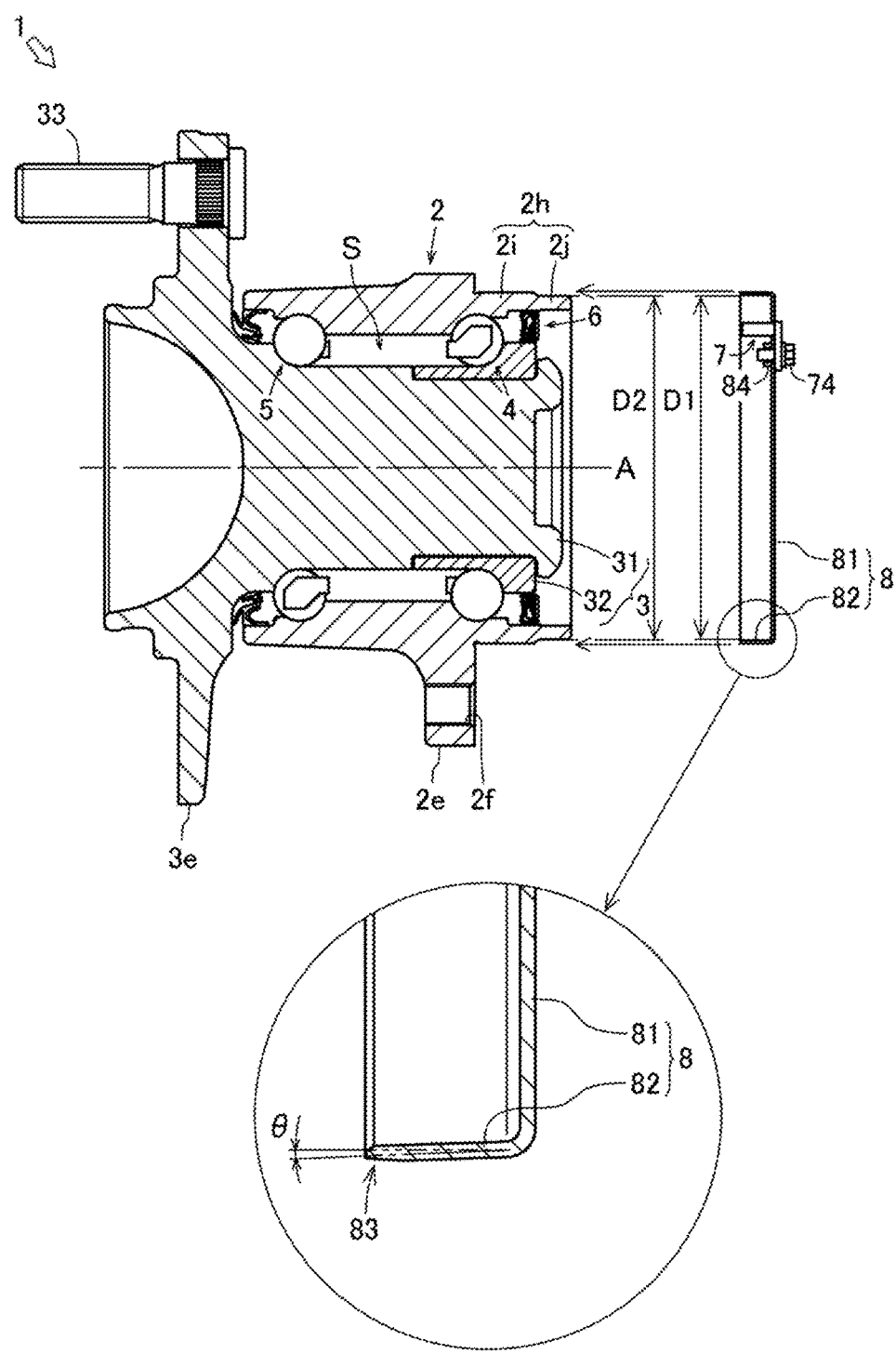
FIG. 3 is a view showing a situation in which a cap member is attached to a fitting cylinder section of an outer member.

In addition to this, this bearing device for a vehicle wheel 1 includes a cap member 8 in order to prevent muddy water from reaching the seal member 6, by closing an inner open end of the outer member 2. Hereinafter, a description is given to a structure in which the cap member 8 can be attached to a fitting cylinder section 2h of the outer member 2. FIG. 3 is a view showing a situation in which the cap member 8 is attached to the fitting cylinder section 2h of the outer member 2.

The outer member 2 is formed with the fitting cylinder section (generally referred to as a pilot section) 2h at the inner end section. On the outer side of the fitting cylinder section 2h, a cylindrical large-diameter section 2i centered on the rotation axis A of the inner member 3 is formed. On the inner side of the fitting cylinder section 2h, a cylindrical small-diameter section 2j centered on the rotation axis A of the inner member 3 is formed. That is, the fitting cylinder section 2h has a cylindrical shape having different outer diameter dimensions in the axial direction (see FIGS. 1 and 2).

Whereas, the cap member 8 is formed by cutting out and bending a metal steel plate by press working. The cap member 8 has a disc-shaped cover plate section 81 centered on the rotation axis A of the inner member 3, and a cylindrical fitting section 82 extending from a radially outward end section of the cover plate section 81 toward the outer side and centered on the rotation axis A. Then, the fitting section 82 is fitted over the small-diameter section 2j of the fitting cylinder section 2h. Note that the fitting section 82 is slightly opened radially outward due to so-called spring back. Therefore, the fitting section 82 has a tapered shape with a spring back angle θ with respect to the axial direction. Further, when an inner diameter of the fitting section 82 is D1 and an outer diameter of the small-diameter section 2j is D2, a relational expression D1≤D2 is satisfied. This makes it possible to prevent the cap member 8 from falling off.

Figure 4:
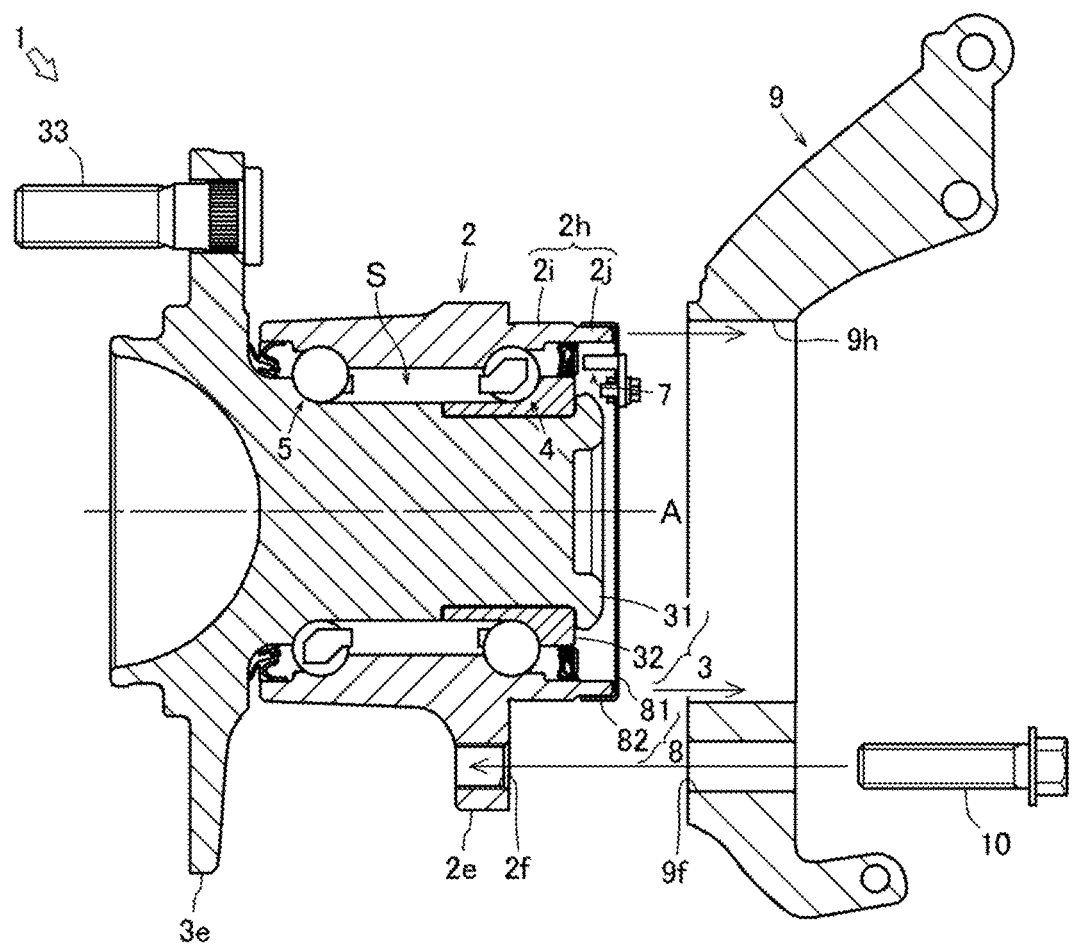
FIG. 4 is a view showing a situation in which the fitting cylinder section of the outer member is fitted into a fitting hole section of a vehicle body-side member.

Here, a description is given to a structure in which the bearing device for a vehicle wheel 1 can be mounted to a vehicle body-side member (generally referred to as a knuckle) 9. FIG. 4 is a view showing a situation in which the fitting cylinder section 2h of the outer member 2 is fitted into a fitting hole section 9h of the vehicle body-side member 9.

The bearing device for a vehicle wheel 1 is fixed in a state where the fitting cylinder section 2h of the outer member 2 is fitted into the fitting hole section 9h of the vehicle body-side member 9. Specifically, the bearing device for a vehicle wheel 1 is fixed to the vehicle body-side member 9 by a bolt 10 in a state where the fitting cylinder section 2h of the outer member 2 is fitted into the fitting hole section 9h of the vehicle body-side member 9, and where an inner end surface of the vehicle-body mounting flange 2e abuts on an outer end surface of the vehicle body-side member 9. At this time, the bolt 10 is inserted into a through hole 9f of the vehicle body-side member 9 from the inner side, and screwed into the bolt hole 2f of the vehicle-body mounting flange 2e. However, in a case where the vehicle-body mounting flange 2e is provided with a through hole and the vehicle body-side member 9 is provided with a bolt hole, the bolt 10 is inserted into the through hole of the vehicle-body mounting flange 2e from the outer side and screwed into the bolt hole of the vehicle body-side member 9. Note that, even if the vehicle body-side member 9 is a motor case included in an in-wheel motor, the fixing can be similarly made.

Figure 5:
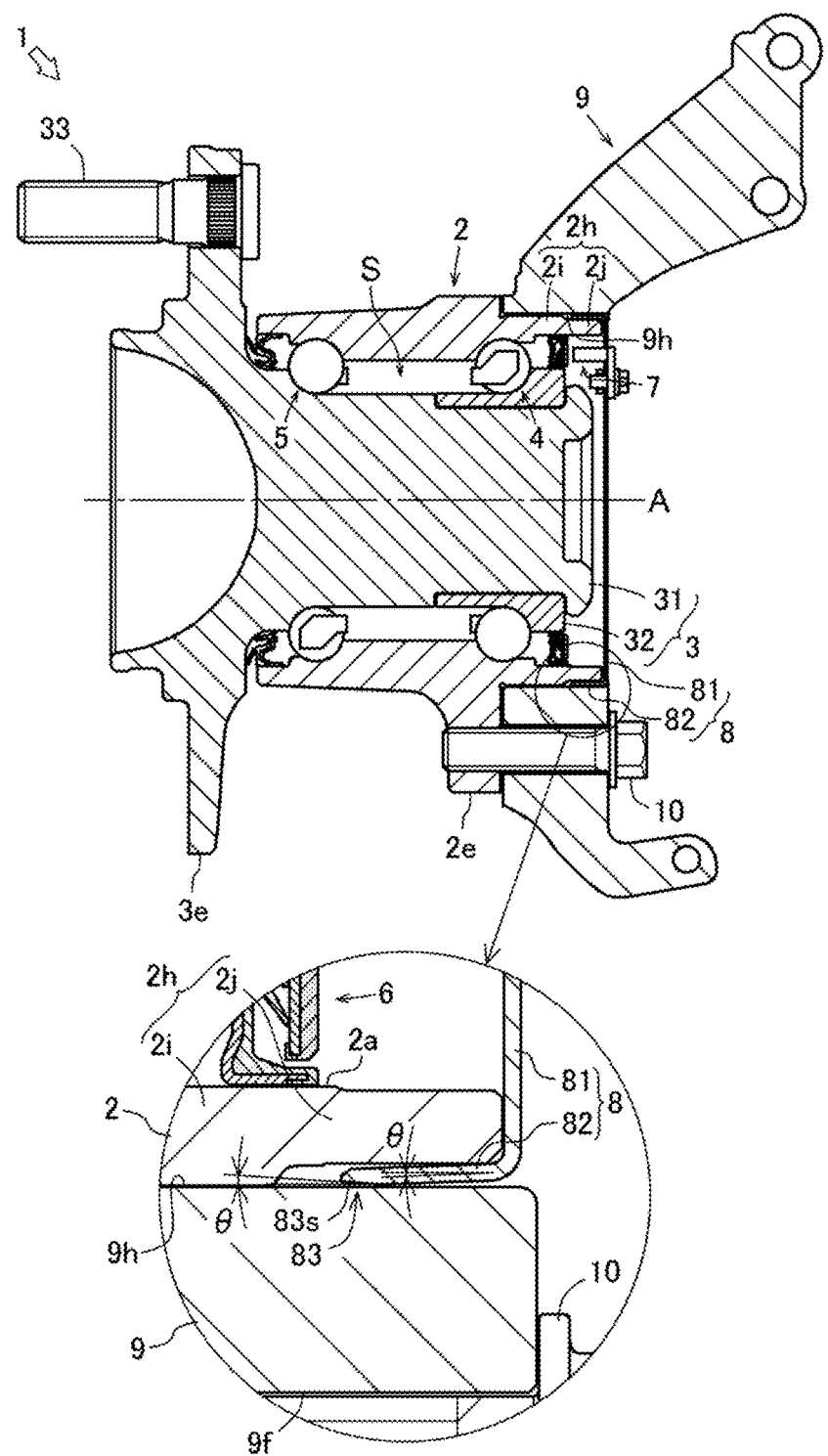
FIG. 5 is a view showing a main part shape of a cap member according to a first embodiment.

Next, features and effects of the cap member 8 according to the first embodiment will be described. FIG. 5 is a view showing a main part shape of the cap member 8 according to the first embodiment.

The cap member 8 according to the present embodiment has a feature of being provided with a tapered portion 83 on an outer peripheral edge at an outer end section of the fitting section 82 (see FIGS. 3 and 5). Such a tapered portion 83 is a portion inclined at the spring back angle θ such that an inclined surface 83s is reduced in diameter, with respect to the fitting section 82 that expands in diameter from the inner side to the outer side due to spring back. However, in the cap member 8 according to the present embodiment, the inclination angle of the tapered portion 83 is not limited to the spring back angle θ, but may be an angle approximated to the spring back angle θ. This is because it is sufficient that the fitting section 82 of the cap member 8 can be prevented from interfering with an inner peripheral edge of the fitting hole section 9h, when the fitting cylinder section 2h of the outer member 2 is fitted into the fitting hole section 9h of the vehicle body-side member 9.

As described above, in the bearing device for a vehicle wheel 1 provided with the cap member 8 according to the first embodiment, the large-diameter section 2i is formed on the outer side of the fitting cylinder section 2h, and the small-diameter section 2j is formed on the inner side of the fitting cylinder section 2h. Then, the cap member 8 is formed by bending a metal steel plate, to have the cover plate section 81 that closes the inner open end of the outer member 2 and have the fitting section 82 that is fitted over the small-diameter section 2j, and to be provided with the tapered portion 83 based on the spring back angle θ of the fitting section 82, on the outer peripheral edge at the outer end section of the fitting section 82. According to such a bearing device for a vehicle wheel 1, the fitting section 82 of the cap member 8 does not interfere with the inner peripheral edge of the fitting hole section 9h when the fitting cylinder section 2h of the outer member 2 is fitted into the fitting hole section 9h of the vehicle body-side member 9, and accordingly an assembling property of an automobile can be improved.

In addition, according to such a bearing device for a vehicle wheel 1, strength of the fitting cylinder section 2h does not decrease, unlike a case where the outer diameters of the small-diameter section 2j and has the fitting section 82 are designed to be small in advance to prevent the fitting section 82 from interfering with the inner peripheral edge of the fitting hole section 9h.

Figure 6:
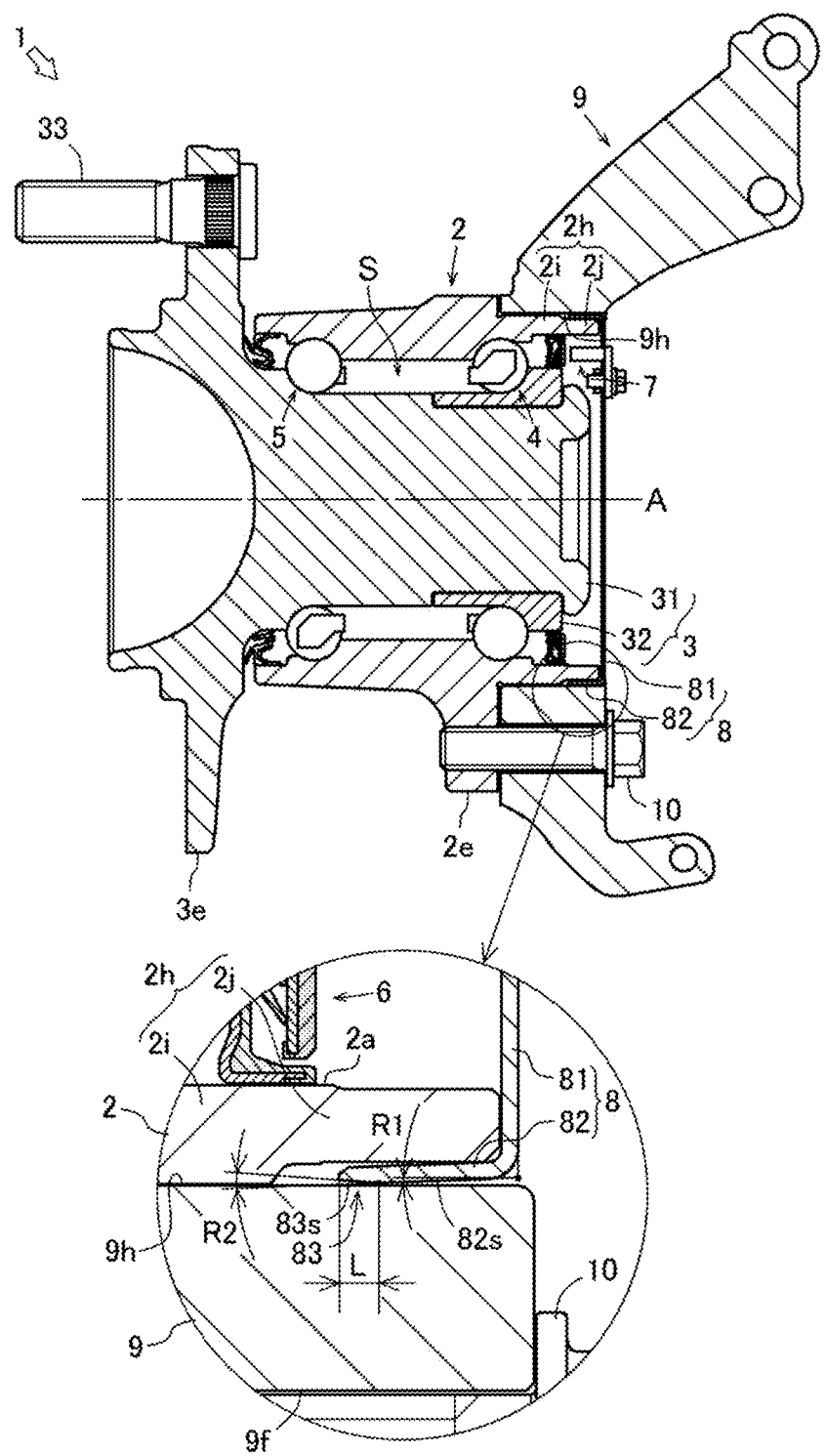
FIG. 6 is a view showing a main part shape of a cap member according to a second embodiment.

Next, features and effects of a cap member 8 according to a second embodiment will be described. FIG. 6 is a view showing a main part shape of the cap member 8 according to the second embodiment.

The cap member 8 according to the present embodiment is also provided with a tapered portion 83. Such a tapered portion 83 is a portion inclined at a predetermined angle such that an inclined surface 83s is reduced in diameter, with respect to an outer peripheral surface 82s of a fitting section 82 that expands in diameter from the inner side to the outer side. Here, when an angle of the outer peripheral surface 82s of the fitting section 82 with respect to a rotation axis A of an inner member 3 is R1, and an angle of the inclined surface 83s of the tapered portion 83 with respect to the outer peripheral surface 82s of the fitting section 82 is R2, a relational expression R1≤R2 is satisfied. Note that, it is clear that an axial length L of the inclined surface 83s is set longer than a position where the fitting section 82 of the cap member 8 interferes with an inner peripheral edge of a fitting hole section 9h.

As described above, in the bearing device for a vehicle wheel 1 provided with the cap member 8 according to the second embodiment, when an angle of the outer peripheral surface 82s of the fitting section 82 with respect to the rotation axis A of the inner member 3 is R1, and an angle of the inclined surface 83s of the tapered portion 83 with respect to the outer peripheral surface 82s of the fitting section 82 is R2, a relational expression R1≤R2 is satisfied. According to such a bearing device for a vehicle wheel 1, it is possible to reliably prevent the fitting section 82 of the cap member 8 from interfering with the inner peripheral edge of the fitting hole section 9h. Therefore, it is possible to further improve the assembling property of the automobile.

Figure 7:
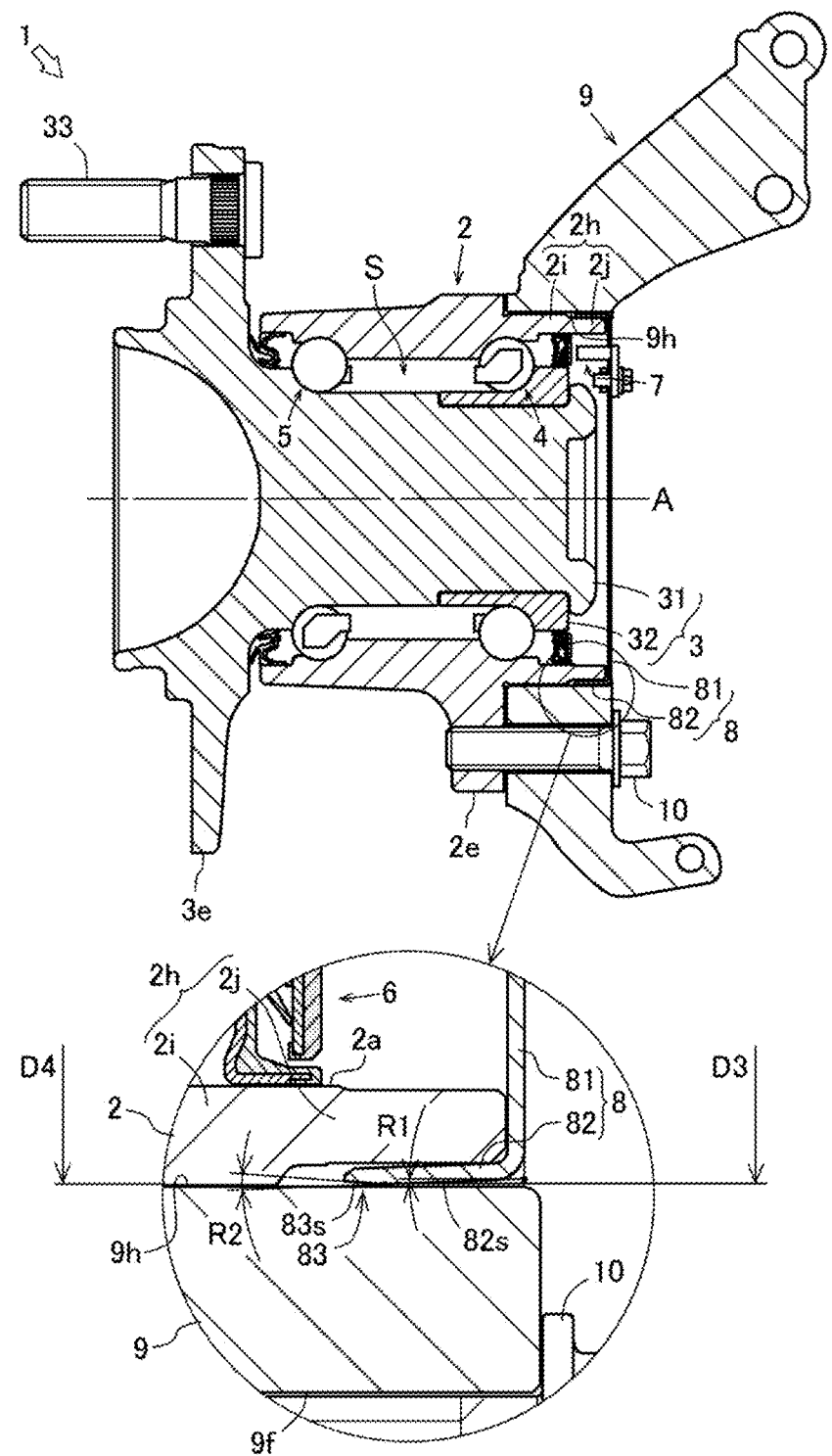
FIG. 7 is a view showing a main part shape of a cap member according to a third embodiment.
Figure 8:
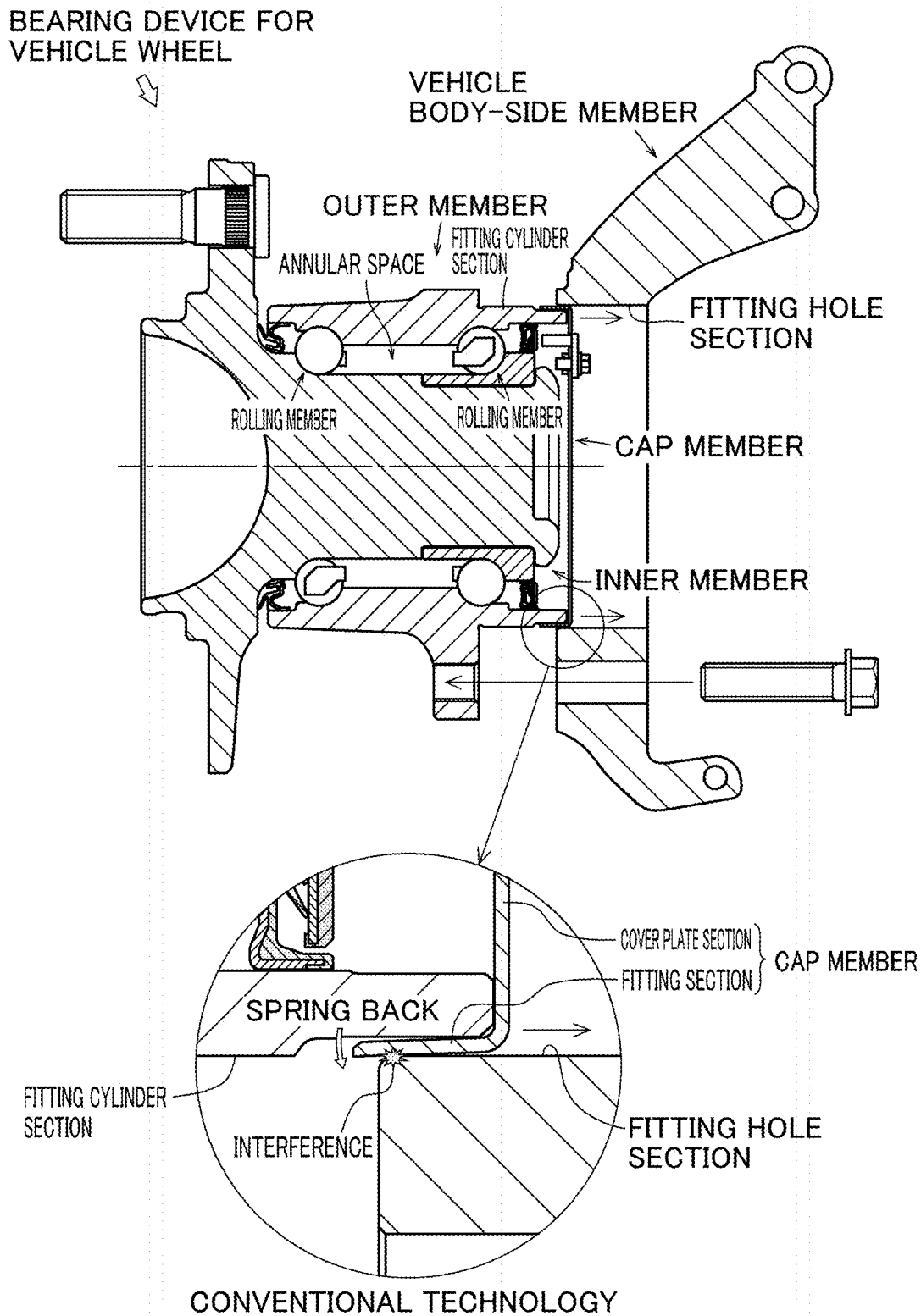
FIG. 8 is a view showing a situation in which a fitting section of the cap member interferes with an inner peripheral edge of the fitting hole section.

Next, features and effects of a cap member 8 according to a third embodiment will be described. However, only a part different from the cap member 8 according to the second embodiment will be described. FIG. 7 is a view showing a main part shape of the cap member 8 according to the third embodiment.

Also in the present embodiment, when an angle of an outer peripheral surface 82s of a fitting section 82 with respect to a rotation axis A of an inner member 3 is R1, and an angle of an inclined surface 83s of a tapered portion 83 with respect to the outer peripheral surface 82s of the fitting section 82 is R2, a relational expression R1≤R2 is satisfied. Further, when the above-mentioned relational expression D1≤D2 is satisfied, the fitting section 82 is further opened radially outward when the cap member 8 is attached. However, when an outer diameter of the fitting section 82 is D3 and an outer diameter of a large-diameter section 2i is D4, a relational expression D3≤D4 is satisfied.

As described above, in the bearing device for a vehicle wheel 1 provided with the cap member 8 according to the third embodiment, when an inner diameter of the fitting section 82 is D1, an outer diameter of a small-diameter section 2j is D2, an outer diameter of the fitting section 82 is D3, and an outer diameter of the large-diameter section 2i is D4, the relational expression D1≤D2 and the relational expression D3≤D4 are satisfied. According to such a bearing device for a vehicle wheel 1, even with a design in which the fitting section 82 is pushed strongly to the small-diameter section 2j to prevent falling off, it is possible to reliably prevent the fitting section 82 of the cap member 8 from interfering with the inner peripheral edge of the fitting hole section 9h. Therefore, it is possible to prevent the cap member 8 from falling off, and further improve the assembling property of the automobile.

Next, other features and effects of the cap member 8 according to each embodiment will be described.

The cap member 8 according to each embodiment is provided with two holes at predetermined positions of the cover plate section 81. A hole on the radially outward side is provided in a portion of the cover plate section 81 facing the encoder 63, and a sensor 7 that detects magnetism of the encoder 63 is inserted into this hole (see FIGS. 1 to 7). Further, a bolt 74 to fix the sensor 7 is inserted into a hole on the radially inward side, and is screwed into a nut 84 welded to the cover plate section 81 (see FIGS. 2 and 3). In this way, the cap member 8 according to each embodiment can support the sensor 7. Note that, in the cap member 8 according to each embodiment, since the fitting section 82 does not interfere with the fitting hole section 9h, distortion is not transmitted from the fitting section 82 to the cover plate section 81.

As described above, the bearing device for a vehicle wheel 1 provided with the cap member 8 according to the present embodiment includes the encoder 63 that rotates integrally with the inner member 3, and the sensor 7 that is in proximity to the encoder 63 and detects magnetism of the encoder 63. Then, the cap member 8 supports the sensor 7. According to such a bearing device for a vehicle wheel 1, the cover plate section 81 of the cap member 8 is not distorted, so that a gap between the encoder 63 and the sensor 7 does not vary.

INDUSTRIAL APPLICABILITY

The present invention can be used for a bearing device for a vehicle wheel.

REFERENCE SIGNS LIST

1 Bearing device for a vehicle wheel
2 Outer member

2c Outer raceway surface
2d Outer raceway surface
2h Fitting cylinder section
2i Large-diameter section
2j Small-diameter section
3 Inner member
31 Hub ring
32 Inner ring
3c Inner raceway surface
3d Inner raceway surface
4 Rolling member
5 Rolling member
6 Seal member
63 Encoder
7 Sensor
8 Cap member
81 Cover plate section
82 Fitting section
83 Tapered portion
9 Vehicle body-side member
9h Fitting hole section
A Rotation axis of inner member
θ Spring back angle
R1 Angle of outer peripheral surface of fitting section with respect to rotation axis of inner member
R2 Angle of inclined surface of tapered portion with respect to outer peripheral surface of fitting section
D1 Inner diameter at fitting section
D2 Outer diameter at small-diameter section
D3 Outer diameter at fitting section
D4 Outer diameter at large-diameter section

The invention claimed is:

1. A bearing device for a vehicle wheel, comprising:
an outer member formed with an outer raceway surface;
an inner member that includes a hub ring and at least one inner ring that is fitted over the hub ring, the inner member being formed with an inner raceway surface;
a rolling member interposed between respective raceway surfaces of the outer member and the inner member; and
a cap member that is fitted over the outer member, the bearing device for a vehicle wheel being fixed in a state where a fitting cylinder section formed at an inner end section of the outer member is fitted into a fitting hole section of a vehicle body-side member, wherein,
wherein a large-diameter section is formed on an outer side of the fitting cylinder section,
a small-diameter section is formed on an inner side of the fitting cylinder section, and
the cap member is formed by bending a metal steel plate, to have a cover plate section that closes an inner open end of the outer member and have a fitting section that is fitted over the small-diameter section, the cap member being provided with a tapered portion based on a spring back angle of the fitting section, on an outer peripheral edge at an outer end section of the fitting section.

2. The bearing device for a vehicle wheel according to claim 1, wherein
when an angle of an outer peripheral surface of the fitting section with respect to a rotation axis of the inner member is R1, and
an angle of the outer peripheral surface of the tapered portion with respect to an outer peripheral surface of the fitting section is R2,
a relational expression $R1 \leq R2$ is satisfied.

3. The bearing device for a vehicle wheel according to claim 1, wherein
when an inner diameter of the fitting section is D1,
an outer diameter of the small-diameter section is D2,
an outer diameter of the fitting section is D3, and
an outer diameter of the large-diameter section is D4,
a relational expression $D1 \leq D2$ and a relational expression $D3 \leq D4$ are satisfied.

4. The bearing device for a vehicle wheel according to claim 1, further comprising:
an encoder that rotates integrally with the inner member; and
a sensor that is in proximity to the encoder and detects magnetism of the encoder,
wherein the cap member supports the sensor.

* * * * *